United States Patent
Inkumsah et al.

(10) Patent No.: US 8,953,851 B2
(45) Date of Patent: Feb. 10, 2015

(54) OCULAR BIOMETRIC AUTHENTICATION WITH SYSTEM VERIFICATION

(71) Applicant: International Business Machines Corporation, Armonk, NY (US)

(72) Inventors: Kobina K. Inkumsah, Lansing, MI (US); Adrian X. Rodriguez, Durham, NC (US); Eric Woods, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/062,279

(22) Filed: Oct. 24, 2013

(65) Prior Publication Data

US 2014/0050371 A1 Feb. 20, 2014

Related U.S. Application Data

(63) Continuation of application No. 13/586,364, filed on Aug. 15, 2012.

(51) Int. Cl.
| | | |
|---|---|---|
| G06K 9/00 | (2006.01) | |
| G06F 3/01 | (2006.01) | |
| G06F 21/32 | (2013.01) | |
| G06F 21/36 | (2013.01) | |
| G06F 21/44 | (2013.01) | |

(52) U.S. Cl.
CPC ............ *G06K 9/00617* (2013.01); *G06F 3/013* (2013.01); *G06K 9/00597* (2013.01); *G06F 21/32* (2013.01); *G06F 21/36* (2013.01); *G06F 21/44* (2013.01); *G06F 2221/2103* (2013.01)
USPC .......................................................... 382/117

(58) Field of Classification Search
None
See application file for complete search history.

(56) References Cited

U.S. PATENT DOCUMENTS

| | | | |
|---|---|---|---|
| 7,451,323 B2 | 11/2008 | Abe et al. | |
| 7,986,816 B1 * | 7/2011 | Hoanca et al. | 382/115 |
| 8,086,745 B2 | 12/2011 | Liew et al. | |
| 2006/0282671 A1 * | 12/2006 | Burton | 713/176 |
| 2008/0062291 A1 * | 3/2008 | Sako et al. | 348/294 |
| 2008/0266257 A1 * | 10/2008 | Chiang | 345/163 |

(Continued)

OTHER PUBLICATIONS

Steel, Emily, "Device Raises Fear of Facial Profiling", http://online.wsj.com/article/SB10001424052702303678704576440253307985070.html, Aug. 16, 2011, 4 pages.

(Continued)

*Primary Examiner* — Vu Le
*Assistant Examiner* — Alexander J Lesnick
(74) *Attorney, Agent, or Firm* — Mark E. McBurney; Jeffrey L. Streets

(57) ABSTRACT

A biometric user authentication method and computer program product includes receiving asserted user credentials from a user into a biometric authentication system, and obtaining a digitally-stored image key and ocular biometric data both associated with the asserted user credentials from memory within the biometric authentication system. The biometric authentication system is verified by simultaneously displaying the image key and at least one image other than the image key to the user and detecting that the user has selected the image key. The user is authenticated by scanning an eye of the user to obtain ocular biometric data and matching the scanned ocular biometric data to the digitally stored ocular biometric data. If the biometric system is verified and the user is authenticated, then the user is provided access to a protected area.

20 Claims, 4 Drawing Sheets

(56) References Cited

U.S. PATENT DOCUMENTS

2009/0141895 A1* 6/2009 Anderson et al. ............. 380/252
2010/0017616 A1 1/2010 Nichols et al.
2010/0037313 A1* 2/2010 Tomeny ......................... 726/19
2011/0145901 A1* 6/2011 Di Crescenzo ................. 726/7
2011/0197070 A1* 8/2011 Mizrah ......................... 713/176
2012/0019379 A1 1/2012 Ben Ayed
2012/0081282 A1* 4/2012 Chin ............................ 345/156
2012/0199653 A1* 8/2012 Wenzel ........................ 235/382

OTHER PUBLICATIONS

"USPTO Non-Final Office Action" mailed: Jun. 23, 2014, 12 pages.

* cited by examiner

OCULAR BIOMETRIC AUTHENTICATION WITH SYSTEM VERIFICATION

CROSS-REFERENCE TO RELATED APPLICATIONS

This application is a continuation of U.S. patent application Ser. No. 13/586,364 filed on Aug. 15, 2012, which application is incorporated by reference herein.

BACKGROUND OF THE INVENTION

1. Field of the Invention

The present invention relates to capturing ocular biometric data and using the captured ocular biometric data to authenticate users.

2. Background of the Related Art

Biometrics is a technological field involving the machine-assisted analysis of human biological and behavioral characteristics to identify people. Biometric data commonly used in biometrics includes fingerprints, hand geometry, hand-written signature, facial features, voice characteristics, and ocular characteristics such as iris and retina recognition. These characteristics vary at least slightly from person to person, and machines can discern these sometimes subtle biological and behavioral differences between humans at sufficient resolution to differentiate between people. The ability of a machine to accurately discern these differences between humans makes biometrics desirable for use in security systems. Biometric analysis is often used, for example, to restrict access to authorized personnel, where the personnel can be identified or at least have their identities confirmed using biometric analysis. The ability of a machine to repetitively and reliably process a large volume of data also makes such systems viable for use in high-traffic locations where many people have to be screened, such as at banks, airports, and military bases.

Ocular biometrics is one area of biometrics that focuses on identifying individuals by the distinguishing characteristics of the human eye. Within ocular biometrics, retina scanning and iris scanning are two technologies that have proven to be reliable, and are already widely used in many governmental agencies and commercial applications. Retina scanning, which is considered to be the more invasive of the two technologies, uses a device positioned near the eye to send a beam of light deep inside the eye to enable an image of the retina to be captured. Iris scanning has been more widely adopted, in part, because it is generally considered to be less invasive. Iris scanning is a process of recognizing a person by the unique pattern of the iris, which is the externally observable colored ring near the front of the eye. Although the coloration and structure of the iris are genetically linked, the details of the pattern are structurally distinct due to the unique development of the iris during prenatal growth.

BRIEF SUMMARY OF THE INVENTION

A biometric user authentication method is disclosed. In one embodiment, asserted user credentials are received from a user into a biometric authentication system. A digitally-stored image key and ocular biometric data are obtained, both of which are associated with the asserted user credentials, from memory within the biometric authentication system. The biometric authentication system is verified by simultaneously displaying the image key and at least one image other than the image key to the user and detecting that the user is viewing the image key. The user is authenticated by scanning an eye of the user to obtain ocular biometric data and matching the scanned ocular biometric data to the digitally stored ocular biometric data. User access is provided to a protected area in response to both successfully verifying the biometric system and authenticating the user. The method may be implemented by a computer program product including computer usable program code embodied on a computer usable storage medium for controlling access to a protected area.

Another embodiment of the invention provides a computer program product including computer usable program code embodied on a computer usable storage medium for controlling access to a protected area. The computer program product includes computer usable program code for receiving asserted user credentials from a user into a biometric authentication system; computer usable program code for obtaining a digitally-stored image key and ocular biometric data both associated with the asserted user credentials from memory within the biometric authentication system; computer usable program code for verifying the biometric authentication system by simultaneously displaying the image key and at least one image other than the image key to the user and detecting that the user is viewing the image key; computer usable program code for authenticating the user by causing an eye of the user to be scanned to obtain ocular biometric data and matching the scanned ocular biometric data to the digitally stored ocular biometric data; and computer usable program code for providing user access to a protected area in response to both successfully verifying the biometric system and authenticating the user.

DETAILED DESCRIPTION OF THE INVENTION

Figure 1:
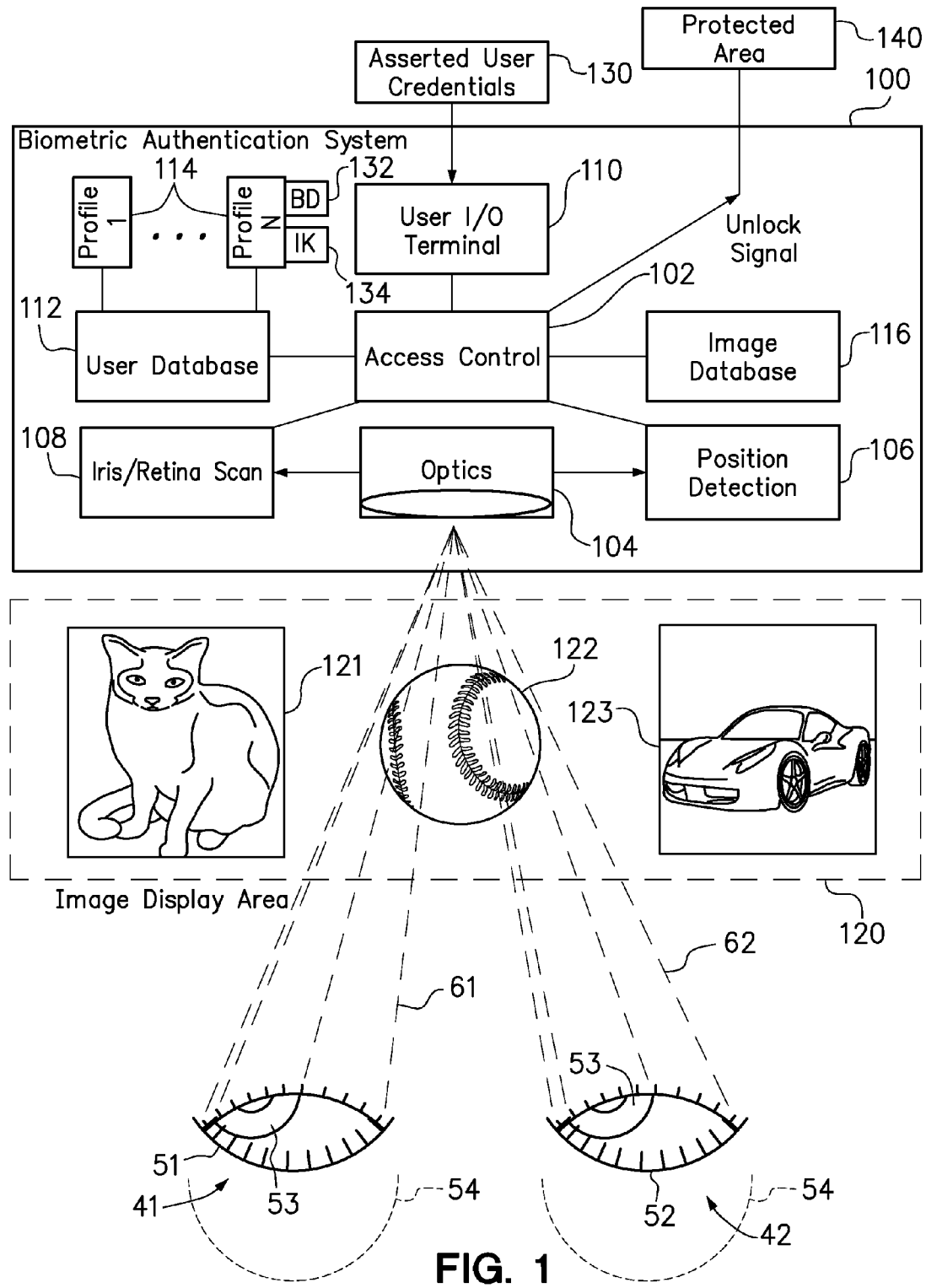
FIG. 1 is a schematic diagram of a biometric user authentication system that senses eyeball position for detecting the user selection of an image.

One embodiment of the invention provides a biometric user authentication method. Asserted user credentials are received from a user into a biometric authentication system. A digitally-stored image key and ocular biometric data are obtained, both of which are associated with the asserted user credentials, from memory within the biometric authentication system. The biometric authentication system is verified by simultaneously displaying the image key and at least one image other than the image key to the user and detecting that the user is viewing the image key. The user is authenticated by scanning an eye of the user to obtain ocular biometric data and matching the scanned ocular biometric data to the digitally stored ocular biometric data. User access is provided to a protected area in response to both successfully verifying the biometric system and authenticating the user. The method may be implemented by a computer program product including computer usable program code embodied on a computer usable storage medium for controlling access to a protected area.

Another embodiment of the present invention provides a biometric authentication system comprising an image database includes a plurality of images, and a user database contains a plurality of user profiles. Each user profile is associated with a selected one of the images in the image database as an image key and with an ocular biometric data record obtained from an eye of the associated user. A user input terminal is provided for receiving asserted user credentials. An eye scanning module is provided for obtaining ocular biometric data. A position detection module is provided for detecting an eye position or eyelid position. An access control module is in communication with the user database for obtaining a user profile associated with the asserted user credentials, in communication with a display device for displaying the image key associated with the obtained user profile, in communication with the position detection module for verifying the biometric authentication system by detecting whether the user is viewing the image key, and in communication with the eye scanning module for obtaining ocular biometric data and authenticating the user by matching the obtained ocular biometric data with the ocular biometric data record.

The biometric system and related method are disclosed for authenticating a user, with special features that allow the user to verify, i.e. establish the trustworthiness of, the biometric system. In some embodiments, the user can withhold biometric data until the user has verified the biometric system. The biometric system and method may be used, for example, to provide authorized users with access to a protected area. The protected area may be, for example, a physical area, such as beyond a security checkpoint at an airport, military installation, or bank. Alternatively, the protected area may be an area of electronic storage containing protected content, such as a storage device, directory, folder, or file. The biometric system may normally authenticate a user by obtaining ocular biometric data and matching the ocular biometric data to a user in the electronic database (e.g. by user profile matching). If information identifying the user is located in the electronic database, then the user may be authenticated, i.e. may be confirmed as having the proper credentials to obtain access to the protected area. Access to a physical protected area may be provided, for example, by sending an unlock signal to an electronically-controlled door or other entry point. Access to a protected area of electronic storage may be provided, for example, by removing electronic restrictions to access placed by default on the protected area of electronic storage.

To allow a user to verify the trustworthiness of the system, an image key is associated with user credentials and supplied to the user and to the system. Different users will have different image keys associated with their user credentials. A legitimate system will therefore be able to demonstrate its trustworthiness to the user by presenting the correct image key (the image key associated with that user's user credentials and known to the user), whereas an imposter system will not be able to present the correct image key. Likewise, an authorized user, having been informed of the image key in advance, will be able to select the correct image key from among a plurality of images when presented by the system during system verification. During system verification, the system receives user credentials from the user, looks up the image key associated with the user credentials, and displays the image key and at least one image other than the image key. The user has the opportunity to withdraw or refrain from providing any further confidential information if the image key is not present among the images displayed (indicating the possibility of an imposter system). Assuming the correct image key is displayed, the user can select and confirm the correct image key by, for example, specifically viewing it. The system detects which image the user is viewing to determine whether the user is viewing the correct image key. To authenticate the user, the system obtains biometric data by scanning an eye of the user. In one embodiment, the system is prevented from obtaining the ocular biometric data used to authenticate the user until after the user has selected the correct image key. Optionally, the user may shield his eye/eyes or otherwise select an image without putting the user's eyes in a position to be scanned.

Various ways are disclosed for the system to detect that the user is viewing the correct image key. In one embodiment, the system detects an eyeball position (i.e., orientation or point of focus) of the user to determine which image the user is looking at, such as by determining a line of sight or focal point of the user. In another embodiment, the system presents the correct image key in front of one eye and another image in front of the other eye, and the system detects which one of the user's eyelids is open and which one of the user's eyelids is closed. The user can select an image by holding the eye open in front of the correct image key while closing the other eyelid. The system detects which image the user is viewing based on the eyelid position. If the user is viewing the correct image key with the open eye, the system may then proceed to scan the open eye to obtain ocular biometric data used to authenticate the user.

FIG. 1 is a schematic diagram of a biometric user authentication system 100 that senses eyeball position for detecting the user selection of an image during a step of system verification. The system 100 includes a variety of control logic modules comprising hardware and software elements for controlling various functions performed by the system 100. The system 100 may be controlled by an access control module 102 with at least one processor, which is in communication with the various other logic modules. An optics module 104 includes hardware used to generate and focus one or more light beams 61, 62 on eyes 41, 42 in a controlled manner. The user directs the user's eyes 41, 42 toward the image display area 120. A position detection module 106 in communication with the optics module 104 controls the light beam(s) 61, 62, to detect position and/or movement of a user's eyeballs 51, 52. An iris/retina scanner 108 in communication with the optics module 104 controls the light beam(s) 61, 62, to scan specific regions of the eyeballs 51, 52, such as to obtain the pattern of an iris 53 or an image of a retina 54 to produce the same biometric data stored in the user database 112 for that user. The optics module 104 is represented as a single block in the schematic diagram, but separate optics hardware may be included for each of eye tracking, iris scanning, and retina scanning. Any of a variety of optical eye scanning technologies may be used with the system 100 for detecting and tracking eye position and for scanning the iris 53 or retina 54, such as laser or infrared scanning and tracking.

The system further includes a user input/output (I/O) terminal 110 allowing the user to interact with the system 100. The I/O terminal 110 may have some conventional input/output peripherals such as a keyboard or touchscreen, pointing device, and/or a microphone for inputting voice commands, as well as a dedicated display device and one or more audio speakers. The I/O terminal 110 may be used to receive user credentials, for example.

The system further includes a user database 112 having any number ("1" ... "N") of user profiles 114 for a like number of users. Each user profile 114 may contain an ocular biometric data record ("BD") 132, which may contain a digital representation of an iris pattern or retina image previously obtained from the user. Since every person has a unique iris pattern and retina image, the biometric data for each user may be captured with sufficient resolution to distinguish the associated user from any other user having a user profile 114 in the database 112. However, with a sufficiently large user database, a high level of security may still be obtained even if the digital representation of the iris pattern or retina image for two users are not detectably different. The ocular biometric data may also include one or more additional characteristic, such as an eyeball diameter, or eye color, which alone may be insufficient to fully distinguish a user but which may be used to corroborate the distinguishing characteristic(s) that are also contained within the user profile 114. For example, authenticating a user may require both the scanned iris pattern and the eyeball diameter to match the iris pattern and eyeball diameter stored in the user profile. The user profiles 114 may also contain additional user-specific information such as user credentials, where the user credentials may include a unique login username, password, or combination thereof. The user profiles 114 may also contain separate ocular biometric data for each eye, where the ocular biometric data for one eye serves as the user credentials used to look up the user profile, and the ocular biometric data for the other eye is used to subsequently authenticate the user.

Other user-specific information may also be contained within the user profiles 114 to inform the access control module 102 the level of access for which the user may be authorized. The user profile may specify certain privileges or limitations associated with the rank or job function of a user in accessing the protected area. For example, a user's rank within an organization and corresponding level of access will typically increase over time, in which case the user profile may be dynamically updated. The user profile 114 may therefore specify the user's level of access to a physical area or to electronic content even after authentication. For example, among the authenticated users that are granted general access to a protected area of electronic storage, some authenticated users may have read/write privileges and other authenticated users may have read-only access upon authentication.

An image database 116 digitally stores a plurality of visually distinct images that may be electronically displayed in a display area 120. The display area 120 may be defined by a display screen included with the I/O terminal 110. The display area 120 may alternatively be rendered by the optics module 104 and seen by the user when looking through a lens of the optics module 104. Examples of images include a cat 121, a baseball 122, and a sports car 123. Each user profile 114 contains an image key ("IK") reference 134 to a specific one of these images as the image key. In this example, the cat 121 is the correct image key for a particular user.

As a first layer of security, the user asserts user credentials 130 to be verified by the system 100. In this example, the user credentials 130 initially asserted are manually input to, and received by, the access control module 102 via the user to the I/O terminal 110. The user credentials 130 could alternatively be asserted by automatic detection of biometric data using the optics module 104, in which case the optics module 104 functions as an I/O terminal. For example, one of the user's eyeballs 51 (e.g. the left eye) may be scanned at the optics module 104 and analyzed by the access control module 102 to obtain biometric data from that one eye, to serve as user credentials 130 for looking up the user in the user database 112. The access control module 102 attempts to match the user credentials 130 to one of the user profiles 114 in the user database 112. If the user has a profile found in the database 112, then the system 100 may continue with the next step toward authenticating the user; if not, the system 100 may deny access.

A verification step that involves the user-selection of the correct image key provides a second layer of security. If a user profile 114 is found within the database 112 that corresponds to the user credentials 130, then an image key associated with the user is obtained as part of a system verification step. The content of the image key, which may comprise a graphical electronic image file or object, may be contained within the user profile 114. Alternatively, the content of the image key may simply be referenced by the user profile 114 to be obtained from the image database 116. In this example, the correct image key is the image of the cat 121, which is displayed in the display area 120 along with one or more images other than the correct image key. The other images are the baseball 122 and the sports car 123, which may be selected (at random or otherwise) from the image database 116. While displaying the correct image key (cat 121) along with the one or more images (baseball 22 and sports car 23), the system 100 may then use the position detection module 106 in combination with the optics module 104 to detect a direction or orientation of the eyeballs 51, 52. In this example, the eyeballs are directed at the correct image key—the cat 121— which is detected such as by obtaining a line of sight or focal point. The access control module 102 may be informed by the position detection module 106 that the eye position of the user corresponds to the image of the cat 121, and the access control module 102 confirms the user has selected, by viewing, the correct image key. System verification is complete upon detecting that the user is viewing the correct image key.

An authentication step may be regarded as the third layer of security in which the user may be authenticated using ocular biometric data of the user. The system 100 uses the iris or retina scanner 108 in combination with the relevant optics 104 to scan and obtain the ocular biometric data of one or both of the eyeballs 51, 52. Each eyeball 51, 52 has a unique iris pattern or retina image, and the ocular biometric data of one or both eyeballs 51, 52 may be used to authenticate the user. The scanned iris or retina may be compared to the digital representation of the iris pattern or retina image stored in the associated user profile 114. If the ocular biometric data just obtained by scanning matches the ocular biometric data already stored in the user profile associated with the user credentials, then the access control module 102 authenticates the user, and may provide whatever level of access is specified in the user profile 114.

The access control module 102 may provide access to the protected area in response to successfully verifying the system 100 and authenticating the user by sending an unlock signal to the protected area 140. Access to a physical protected area may be provided, for example, by sending the unlock signal to an electronically-controlled door or other entry point. Access to a protected area of electronic storage may be provided, for example, by removing electronic access restrictions in response to the unlock signal.

Figure 2:
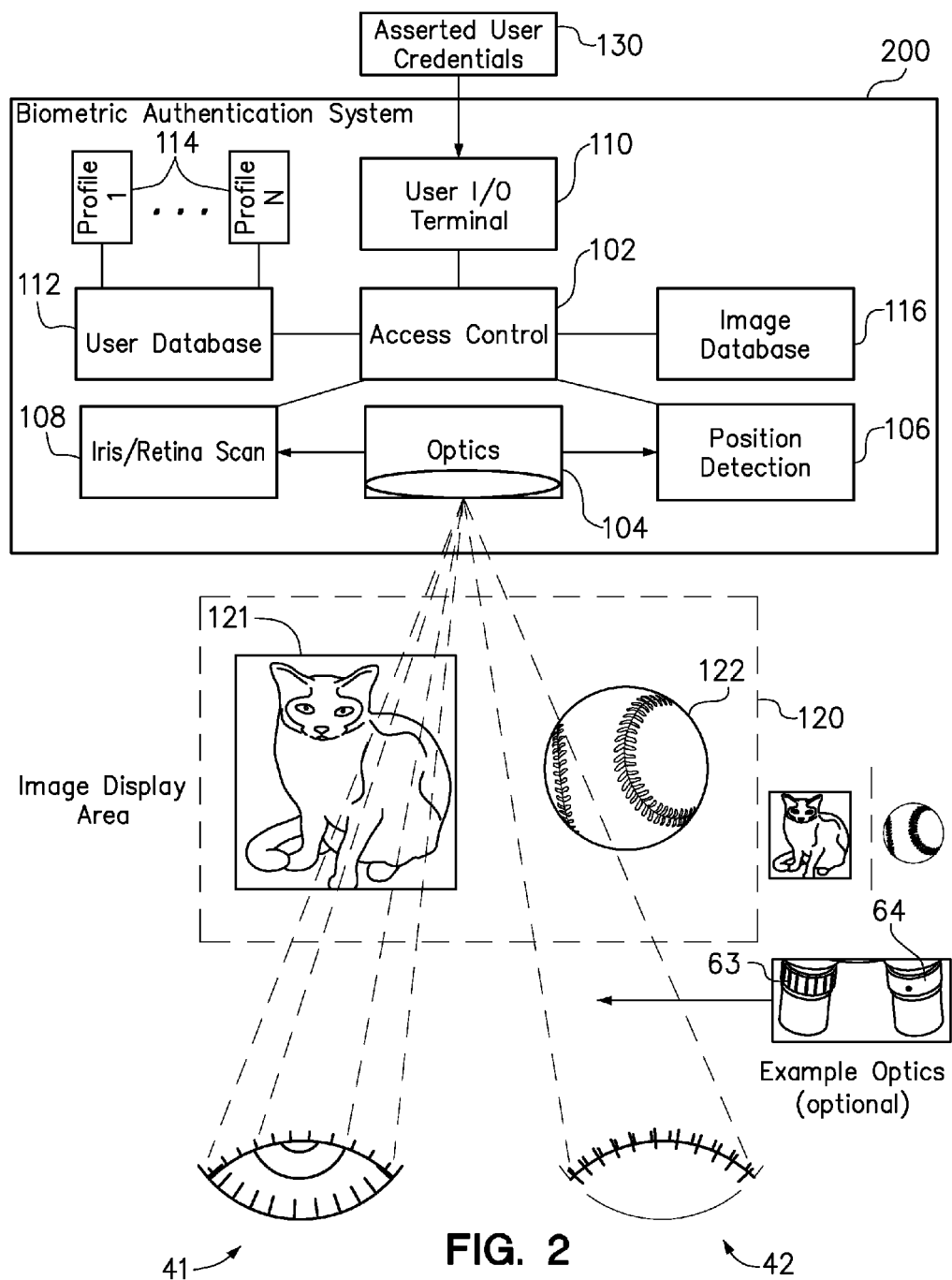
FIG. 2 is a schematic diagram of another biometric user authentication system that uses eyelid movement or position for detecting the user selection of an image.

FIG. 2 is a schematic diagram of another biometric user authentication system 200 that uses eyelid movement or position for detecting the user selection of an image. The system 200 of FIG. 2 includes many of the same components as the system 100 of FIG. 1, which may be indicated with like reference numerals. In this example, the system 200 displays the correct image key (the cat 121) directly in front of the first eye (the user's left eye) 41 and another image (the baseball 122) in front of the second eye (the user's right eye) 42. The optics module 104 may include separate lenses 63, 64 for the user to look through, where the cat 121 is displayed only through one lens 63 to be viewed with the user's left eye 41 and the other image 122 is displayed through the other lens 64 to be viewed with the user's right eye 42. In one implementation, the user may initially view the display area 120 with both eyes 41, 42 wide open, long enough to discern that the correct image is being displayed to the left eye 41. The user may then close the eyelid of the right eye 42, as illustrated, then issue a command to the system 200 using the I/O terminal to scan for biometric data while keeping the right eye 42 closed. The position detection 106 module in this embodiment may detect eyelid position. The position detection 106 in cooperation with the optics module 104 may therefore detect that the left eye 41 is open to detect that the user is viewing the correct image key (the cat 121), to complete the step of system verification. In response to system verification, the iris/retina scanner 108 may then scan the open eye and match the ocular biometric data to the iris pattern or retina image in the user profile 114, to authenticate the user.

Figure 3:
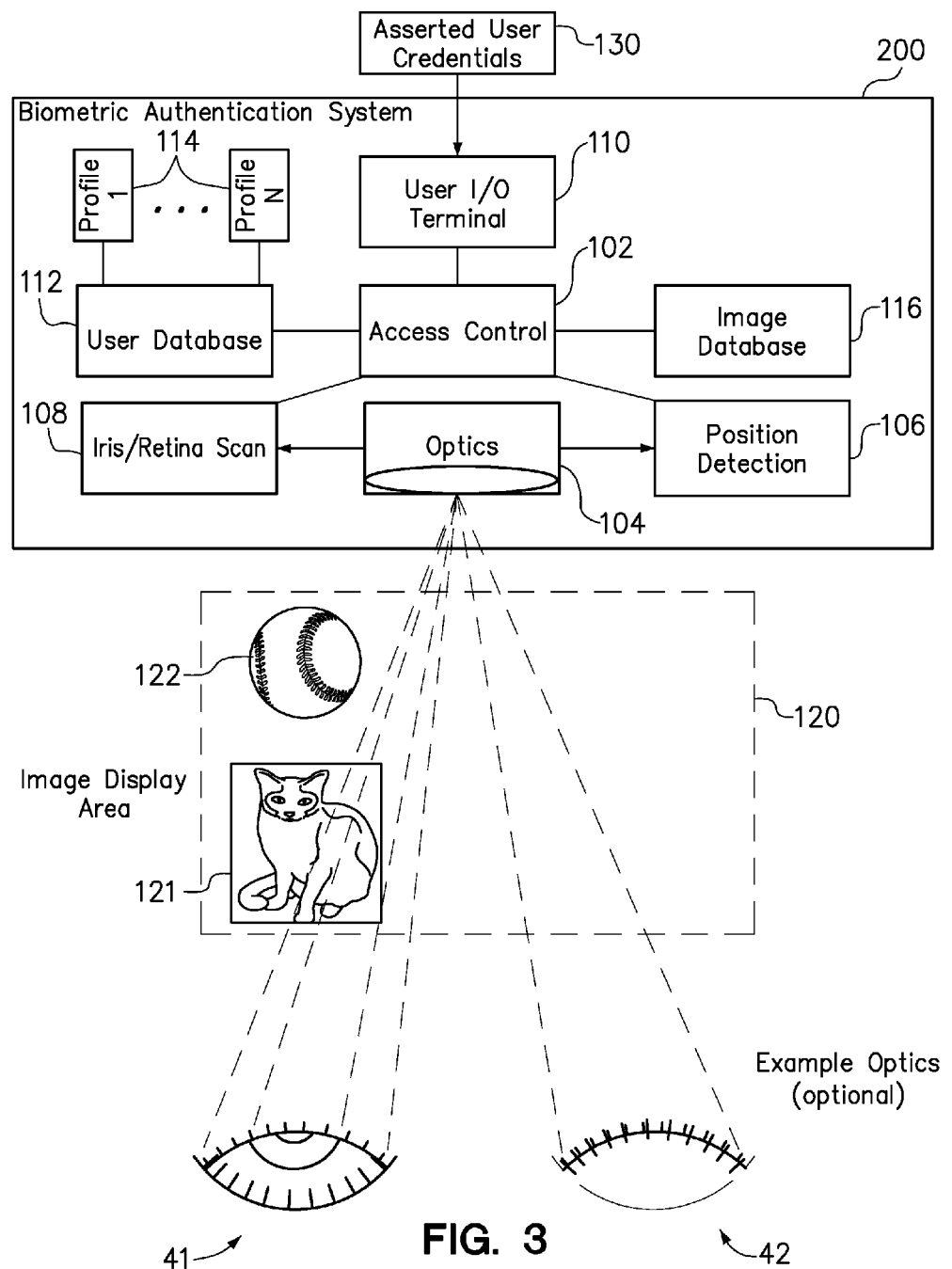
FIG. 3 is a schematic diagram illustrating an alternative implementation of the system of FIG. 2, wherein biometric data of one eye is used an index for retrieving the correct image key from memory and biometric data of the other eye is used for authenticating the user.

FIG. 3 is a schematic diagram of an alternative implementation of the system 200 of FIG. 2 wherein biometric data obtained from the first eye (the user's left eye 41) is used for selecting the correct image key and biometric data obtained from the second eye (the user's right eye 42) is used for authenticating the user. This allows the user to protect the ocular biometric data of the second eye that will later be used to authenticate the user until the system has first verified itself to the user by displaying the correct image key to the first eye. By way of example, the left eye 41 is used for selecting the correct image key and the right eye 42 is used for providing the ocular biometric data used to authenticate the user. The user therefore keeps the right eye 42 closed to protect the ocular biometric features of that eye 42 from being scanned, to prevent the possibility of theft of that ocular biometric data. An eye is considered to be substantially closed if the eyelid is in a position that prevents the respective eyeball from being scanned to obtain sufficient identification for authentication. This embodiment of the system 200 in FIG. 3 allows authentication using only the right eye 42, so that even if the ocular biometric data of the left eye 41 were stolen it could not be used to access the protected area on this particular system 200. The system 200 may require the right eye 42 to be closed before displaying the images 121, 122 to encourage the user habit of keeping the right eye closed when selecting an image key. If the user later unknowingly encounters an illegitimate system, the habit of keeping the right eye closed initially will reduce the likelihood of the illegitimate system stealing right-eye biometric data.

The position detection module 106 may sense both eyelid and eyeball position. Here, the correct image key (the cat 121) and the other image (the baseball 122) are being displayed simultaneously to the user's left eye 41. The user may hold the right eye 42 closed while looking at the images presented. To select the correct image key, the user looks at the image of the cat 121. The user may indicate he or she is ready to input this selection, such as by pushing a button or otherwise entering a command to the I/O terminal 110, while keeping the left eye 41 open and the right eye closed 42. The position detection module 106 in combination with the optics 104 may then be used to analyze the eye position of the left eye 41 to determine that the user is viewing the correct image key. The user may then open the right eye 42 to allow the system 200 to scan the right eye 42 and authenticate the user.

The system 200 of FIGS. 2 and 3 can also be configured to detect a blink pattern as a form of user input. The user may select a blink pattern when setting up the user profile 114. The blink pattern comprises a user-specified pattern of closing and opening the user's two eyes 41, 42. For example, a user may select the blink pattern L-L-R-L-R, which corresponds to a five-blink pattern of blinking twice with the left eye 42, followed by blinking once with the right eye 42, once with the left eye 41, and once again with the right eye 42. The position detection module 106 may detect the position and/or movement of the two eyes 41, 42 via optics module 104. The access control module 102 may then analyze the blinking and match it to the blink pattern in the user profile 114. A blink pattern may be asserted for a variety of different forms of user input, such as commands or user credentials. For example, the blink pattern may be asserted as user credentials used to look up a user profile and to obtain the image key associated with the user profile.

Figure 4:
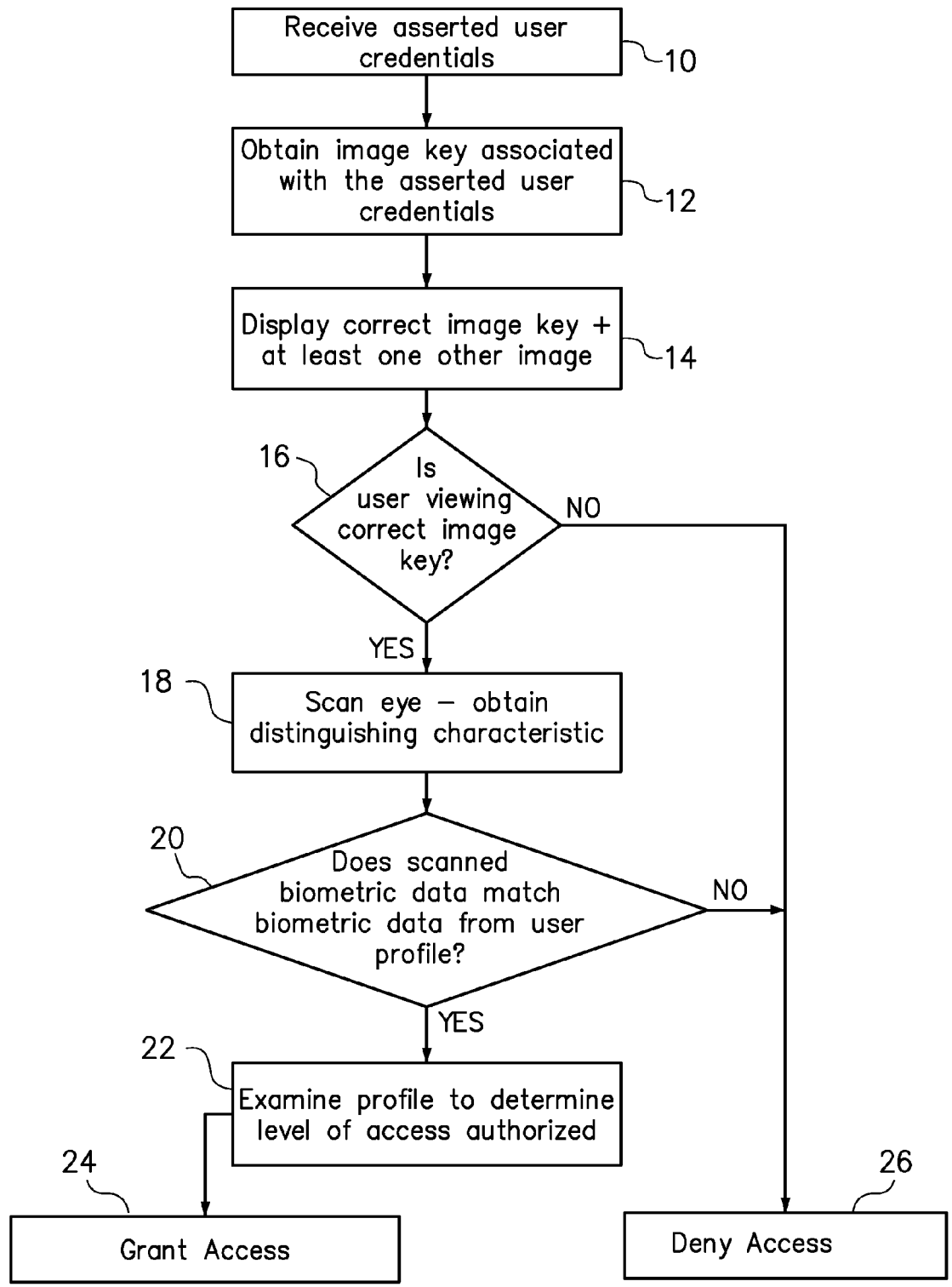
FIG. 4 is a flowchart outlining a biometric authentication method that allows a user to verify a biometric system used in authenticating the user.

FIG. 4 is a flowchart outlining a method of authenticating a user using biometric data that allows the user to verify the trustworthiness of a biometric system used to obtain the biometric data. Step 10 is receiving asserted user credentials. The user credentials are provided by the user for preliminary identification, for use in obtaining an image key associated with the user in step 12. In one example, the user credentials may be a username and/or password, which the user may input to a biometric authentication system using an input peripheral such as a keyboard, touch screen, or microphone. In another example, the user credentials used to look up the correct image key may be asserted by the user performing a pre-selected blink pattern. In yet another example, the user credentials used to look up the image key may also comprise biometric data and even ocular biometric data, but preferably different biometric data than used to subsequently authenticate the user. For example, the ocular biometric data for one eye can be scanned to serve as the user credentials that enable a look up the correct image key for the user and the ocular biometric data for the other eye can subsequently be scanned (step 18) to authenticate the user and provide access to the protected area (step 24). The user may keep the other eye closed or otherwise shielded in order to prevent scanning of that eye prior to the user verifying the legitimacy of the system. An additional step may be performed for detecting that the first eye is open and the second eye is substantially closed as a precondition to displaying the correct image key in view of the first eye. This step may be performed by a legitimate system as a matter of routine so that the user develops the habit of closing the second eye until the system has been verified.

Step 12 is the step of obtaining the image key associated with the user credentials received in step 10. The user credentials are still referred to as "asserted" prior to authentication, since the user has not yet been authenticated, and it may be possible for a person to enter the wrong user credentials, either by mistake or in an effort to assert a false identity. To obtain the image key, the asserted user credentials may be used to look up a user profile associated with the asserted user credentials, which contains the image key and a digital representation of biometric data associated with the asserted user credentials. If the user credentials exist in the user database and have an associated image key, then that image key is retrieved.

In step 14, a plurality of images is displayed to the user, including the image key (retrieved in step 12) and at least one image other than the image key. Those images are displayed in a way that allows the user an opportunity to choose the correct image key from among the displayed images. Since the image key is known to the user, an authorized user who inputs the user's own user credentials should be able to recognize the correct image key from among the plurality of displayed images. The at least one image other than the correct image key provides a preliminary layer of security that protects both the user and the system. The user is protected in this step because an invalid or imposter system should be unable to provide the correct image key. The system is also protected in this step because the user should know, and be able to select, the correct image key from among the displayed images. Different users will have different image keys associated with their user credentials. The "correct" image key for a given user is the image key associated with the user credentials.

Conditional step 16 is to detect whether the user is viewing the correct image key from among the plurality of images displayed per step 14. This step may be implemented in a variety of different ways, with examples provided in the system embodiments of FIGS. 1-3. In one embodiment, the correct image key may be displayed directly in front of one eye and an image other than the correct image key may be displayed directly in front of the other eye. The user may select the first image by keeping the first eye open while closing the second eye, and the eyelid position may then be sensed in order to determine which image the user is looking at. In another embodiment, eye tracking technology may be implemented by the system to detect an eye position of the user. The system may determine a line-of-sight or a focal point based on the detected eye position, which may then be used to determine whether the user is viewing the correct image key or one of the other images.

If the user completes system verification by viewing the correct image key per conditional step 16, then step 18 scans an eye to obtain ocular biometric data that will subsequently be used to authenticate the user. The biometric data obtained from the user in this manner includes a distinguishing characteristic of the scanned eye. The distinguishing characteristic may comprise a unique iris pattern or retina image, for example. The biometric data obtained in step 18 may then be compared to the biometric data in the previously retrieved user profile in step 20 to determine if there is a match. If the biometric data just obtained by scanning matches the biometric data stored in the user profile, then the user is authenticated. The user profile may then be examined in step 22 to determine the level of access for this user. The authenticated user may be granted access to a protected (physical or electronic area) in step 24 according to the level of access provided per step 22. If the just-obtained biometric data does not match the biometric data stored in the user profile, then the user is not authenticated. A non-authenticated user may be denied access to the protected area per step 26.

Several layers of security are provided in this process to provide a high level of reliability. An initial layer of security is provided by requiring that the user assert valid user credentials per step 10 to initially look up the image key. If no profile exists for the asserted user credentials, then access can be denied from the outset. The requirement during system verification that the system displays the correct image key and that the user select (by viewing) the correct image key per conditional step 16 provides another security layer that allows the user and the system to establish an initial level of trust. Finally, conditional step 20 uses ocular biometric data to uniquely identify and authenticate the user in a third layer of security.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A biometric user authentication method, comprising:
   receiving asserted user credentials from a user into a biometric authentication system;
   obtaining a digitally-stored image key and ocular biometric data both associated with the asserted user credentials from memory within the biometric authentication system;
   verifying the biometric authentication system by simultaneously displaying the image key and at least one image other than the image key to the user and detecting that the user has selected the image key;
   displaying the image key in view of a first eye but not a second eye;
   displaying the at least one image other than the image key in view of the second eye but not the first eye, wherein detecting that the user has selected the image key comprises detecting that the first eye is open and that the second eye is substantially closed;
   authenticating the user by scanning an eye of the user to obtain ocular biometric data and matching the scanned ocular biometric data to the digitally stored ocular biometric data; and
   providing user access to a protected area in response to both successfully verifying the biometric authentication system and authenticating the user.

2. The biometric user authentication method of claim 1, further comprising:
   performing the step of verifying the biometric authentication system as a prerequisite to the step of scanning the eye of the user in authenticating the user.

3. The biometric user authentication method of claim 1, further comprising:
   in response to detecting that the user is viewing the image key with the first eye, waiting for the second eye to be opened, scanning the second eye of the user to obtain the ocular biometric data of the second eye, and matching the scanned ocular biometric data of the second eye to the digitally stored ocular biometric data.

4. The biometric user authentication method of claim 3, further comprising:
   detecting that the first eye is open and the second eye is substantially closed as a precondition to displaying the image key in view of the first eye.

5. The biometric user authentication method of claim 1, wherein detecting that the user is viewing the image key comprises:
   detecting an eye position of the user to determine whether the eye position corresponds to a line of sight or focal point on the image key.

6. The biometric user authentication method of claim 1, further comprising:
   prompting for a user input of the asserted user credentials;
   in response to receiving the user credentials, looking up the image key corresponding to the received user credentials and displaying the image key along with the at least one image other than the image key.

7. The biometric user authentication method of claim 1, further comprising:
   in response to detecting that the user is viewing the image key, awaiting a user scan command; and in response to the user scan command, performing the step of scanning an eye of the user to obtain ocular biometric data.

8. The biometric user authentication method of claim 1, further comprising:
obtaining a selected blink pattern associated with the asserted user credentials;
detecting an eyelid position or movement and determining whether the eyelid position or movement matches the selected blink pattern associated with the asserted user credentials; and
displaying the image key and the at least one image other than the image key in response to detecting that the eyelid position or movement matches the selected blink pattern associated with the asserted user credentials.

9. The biometric user authentication method of claim 8, wherein the blink pattern comprises:
a pre-established number of one or more blinks with the first eye alternating with a pre-established number of one or more blinks with the second eye.

10. The biometric user authentication method of claim 1, wherein the ocular biometric data comprises one or both of an iris pattern and a retina image.

11. The biometric user authentication method of claim 1, wherein the step of obtaining a digitally-stored image key and ocular biometric data both associated with the asserted user credentials comprises locating a user profile in an electronic user database containing the asserted user credentials, the image key, and the ocular biometric data.

12. A computer program product including computer usable program code embodied on a non-transitory computer readable storage medium for controlling access to a protected area, the computer program product including:
computer usable program code for receiving asserted user credentials from a user into a biometric authentication system;
computer usable program code for obtaining a digitally-stored image key and ocular biometric data both associated with the asserted user credentials from memory within the biometric authentication system;
computer usable program code for verifying the biometric authentication system by simultaneously displaying the image key and at least one image other than the image key to the user and detecting that the user is viewing the image key;
computer usable program code for displaying the image key in view of a first eye but not a second eye;
computer usable program code for displaying the at least one image other than the image key in view of the second eye but not the first eye, wherein the computer usable program code for detecting that the user is viewing the image key comprises computer usable program code for detecting that the first eye is open and that the second eye is substantially closed;
computer usable program code for authenticating the user by causing an eye of the user to be scanned to obtain ocular biometric data and matching the scanned ocular biometric data to the digitally stored ocular biometric data; and
computer usable program code for providing user access to a protected area in response to both successfully verifying the biometric system and authenticating the user.

13. The computer program product of claim 12, further comprising:
computer usable program code for performing the step of verifying the biometric authentication system as a prerequisite to the step of scanning the eye of the user in authenticating the user.

14. The computer program product of claim 12, wherein the computer usable program code for detecting that the user is viewing the image key comprises:
computer usable program code for detecting an eye position of the user to determine whether the eye position corresponds to a line of sight or focal point on the image key.

15. The computer program product of claim 12, further comprising:
computer usable program code for obtaining a selected blink pattern associated with the asserted user credentials;
computer usable program code for receiving a detected eyelid position or movement and determining whether the eyelid position or movement matches the selected blink pattern associated with the asserted user credentials; and
computer usable program code for displaying the image key and the at least one image other than the image key in response to detecting that the eyelid position or movement matches the selected blink pattern associated with the asserted user credentials.

16. The computer program product of claim 12, further comprising:
computer usable program code for, in response to detecting that the user is viewing the image key with the first eye, waiting for the second eye to be opened, scanning the second eye of the user to obtain the ocular biometric data of the second eye, and matching the scanned ocular biometric data of the second eye to the digitally stored ocular biometric data.

17. The computer program product of claim 16, further comprising:
computer usable program code for detecting that the first eye is open and the second eye is substantially closed as a precondition to displaying the image key in view of the first eye.

18. The computer program product of claim 12, wherein the computer usable program code for detecting that the user is viewing the image key comprises:
computer usable program code for detecting an eye position of the user to determine whether the eye position corresponds to a line of sight or focal point on the image key.

19. The computer program product of claim 12, further comprising:
computer usable program code for prompting for a user input of the asserted user credentials;
computer usable program code for, in response to receiving the user credentials, looking up the image key corresponding to the received user credentials and displaying the image key along with the at least one image other than the image key.

20. The computer program product of claim 12, further comprising:
computer usable program code for obtaining a selected blink pattern associated with the asserted user credentials;
computer usable program code for detecting an eyelid position or movement and determining whether the eyelid position or movement matches the selected blink pattern associated with the asserted user credentials; and computer usable program code for displaying the image key and the at least one image other than the image key in response to detecting that the eyelid position or movement matches the selected blink pattern associated with the asserted user credentials.

* * * * *